UNITED STATES PATENT OFFICE.

CHARLES H. PHILLIPS, OF NEW YORK, N. Y., FOR HIMSELF, AND AS ASSIGNEE OF LAWRENCE REID, DECEASED.

IMPROVEMENT IN MEDICAL COMPOUNDS CALLED MILK OF MAGNESIA.

Specification forming part of Letters Patent No. 138,282, dated April 29, 1873; reissue No. 5,923, dated June 16, 1874; application filed June 10, 1874.

*To all whom it may concern:*

Be it known that CHARLES H. PHILLIPS, of the city, county, and State of New York, and LAWRENCE REID, formerly of Brooklyn, in the county of Kings and State aforesaid, now deceased, have invented a certain new and useful Medical Compound, termed by them "Milk of Magnesia," of which the following is a specification:

This invention relates to a new and improved medical preparation, called by them "milk of magnesia," and which, as prepared by their process, consists of a pure hydrate of magnesia, or, in more technical terms, a hydrate of the oxide of magnesium, mixed with or suspended in water, and which, in its preparation, requires the exercise of the utmost care, as well in the selection of the materials from which it is made, so far as their purity is concerned, as in the manipulations of the same during the process of manufacture, in order that a chemically pure article may be produced.

A liquid or fluid magnesia that will be acceptable to the taste and stomach of the most delicate infant, or invalid whose system has been impaired by disease, has long been a medical desideratum; and such a preparation it is claimed they have produced, and perfect confidence is felt that it will finally supplant the impure preparations, termed "fluid" and "solid" magnesias, now in use, when its virtues have been fully developed and made known to the medical faculty; nor it is believed will such be deemed other than a most valuable addition to their dispensatory, despite the generally well-founded objections to the use of proprietary medicines. In fine, it is hoped that upon trial and analysis it will be adopted and dispensed by them because of its greater purity and therapeutical properties.

To enable those skilled in the art to prepare the milk of magnesia, a particular description of the process and materials used in the operation will now be given.

To manufacture one hundred gallons of the milk of magnesia, one hundred and twenty-five pounds of pure sulphate of magnesia is taken and dissolved in two hundred gallons of distilled water, filtering it afterward through paper, if necessary or desirable. To this is then added any pure caustic alkali, such as a solution of pure caustic soda or potash, in quantity sufficient to free and precipitate the magnesia from the sulphuric acid with which it is combined. For this purpose about fifty-seven pounds of the real soda, or about eighty-six pounds of the real potash, thoroughly dissolved in distilled water, are requisite to produce the desired result. The materials above mentioned, having been thoroughly mixed and incorporated with each other, may or may not be subjected to half an hour's boiling, or more, through the aid of steam, either by the diffusion of the steam throughout the mass from the open end of a steam-pipe, or by steam through the medium of a double or jacketed boiler or vessel, or in any other suitable way. In either event sufficient agitation must be employed to prevent the coagulation of the hydrate of magnesia on the bottom or sides. This done, the solution and mixture is allowed to settle for twenty-four hours, or thereabout, and the clear liquor, containing a portion of the soluble sulphate of the alkali employed, then drawn off. More distilled water is then added to the boiler, in quantity sufficient to replace the liquor withdrawn, and steam or heat applied, as before. The boiling may then be allowed to continue as long as in the former case, and the solution again allowed to settle, and which will consume about the same length of time as before, when the clear liquor is to be again drawn off, and the same operations repeated ten or twelve times, with the addition of fresh distilled water each time, so as to effectually remove from the precipitated magnesia the sulphate of the alkali formed during the process of reducing it from its state of combination as a sulphate to its present condition as a hydrate. The supernatant liquor resulting from the last boiling should not only be tasteless, but should yield no precipitate with the exhibition to it of a solution of nitrate of barytes slightly acidulated with nitric acid; otherwise the operation must be repeated until there is no precipitate. The sulphate of magnesia has been described as the source from which the magnesia is obtained in this preparation, but any other pure soluble salt of magnesia will answer the same purpose, such as the chloride of magnesium; and in regard to the caustic soda or caustic potash used, although these articles can be obtained tolerably pure, still it is preferred and considered better to prepare their caustic solution especially for the purpose by the best processes known to chemists. And though it is preferred to use silver vessels in making this preparation, still, earthenware or wooden vessels may be employed.

Crude and impure precipitates of this substance have been more or less used in the arts; but while such may be true, it is insisted that such have no bearing on this preparation, as made by this process. The distinction between them will be immediately apparent, as, by taking a little of the hydrate of magnesia that has resulted from this process and mixing it with a little water, and then comparing it with the others, it will be found that this, instead of at once precipitating itself to the bottom, will remain for a great length of time suspended or diffused through the water, it in this respect differing from all others.

This preparation — and which, as before stated, consists of a pure hydrate of magnesia suspended in water—possesses many advantages over all other preparations of magnesia, from its greater purity and freedom from dangerous alliances or associations. Then, again, its agreeable taste and milk-like smoothness, fluidity, and great curative properties render it a very valuable remedial agent in infantile diseases, and in derangements of the digestive organs of adults generally, and also as a mild aperient for females during pregnancy. It is, moreover, a most effective agent in cases of ordinary gout and gravel, and a sure and speedy remedy for heart-burn, being in the latter respect far superior to the bicarbonates of potash and soda, the use of which so frequently entails the most serious disorders, from the injury they cause to the coat of the stomach. Moreover, this milk of magnesia, as prepared for immediate use, contains about twenty grains of pure magnesia per fluid ounce, or about four times as much real magnesia as there is contained in any of the so-called fluid-magnesia preparations now in use—a point of considerable importance in administering medicine to infants and invalids. But while that is about the strength it will be generally made and offered for sale, it is not proposed to be confined to such proportions, as it may be made weaker or stronger to any required extent, in order to meet the requirements of the profession and the public, and this simply by diminishing or increasing the quantity of water with which the magnesia is mixed, according as the mixture is required to be made weak or strong; but twenty grains per fluid ounce is found to answer an admirable purpose, and may in that form be administered in suitable quantity to young or old without hesitation or danger.

Having thus described what is considered one of the best processes for procuring a pure aqueous mixture of the hydrate of magnesia, another may be alluded to, depending on filtration and washing with pure distilled water for the separation of the alkaline sulphate from the precipitated magnesia. In this process the magnesia is precipitated from the sulphate of magnesia with caustic alkali, as before, using the same proportions of materials. The whole is then placed on filters and repeatedly washed with pure distilled water until the washings no longer give evidence of the presence of sulphates upon being tested with nitrate of barytes, as before described. The pulpy mass is then mixed through sieves, and by agitation, with a sufficiency of water to bring it to the required strength. The great difficulties in this operation are the insufficiency and tediousness of the washing, and the presence of coagulated lumps of hydrate of magnesia, which interferes with the fluidity and consequent efficacy of the magnesia, for which reasons we prefer to keep the magnesia in the fine state in which it is originally precipitated by using the open steam process; or by simply subjecting it to repeated washings with pure distilled water, either hot or cold, and with agitation, if deemed necessary, and then allowing it to settle each time to draw off the supernatant liquor, as in the first process.

Having described this improved preparation of magnesia and the process of manufacturing, what is claimed as new is—

The medical compound herein described, consisting of a hydrate of magnesia mixed with water, and termed a "milk of magnesia," when prepared in the manner substantially as specified.

In testimony that I claim the foregoing as my own I affix my signature in presence of two witnesses.

Witnesses: CHAS. H. PHILLIPS.
C. E. H. PHILLIPS,
W. J. HARRIS.